(No Model.)
J. A. ALEXANDER.
HAME FASTENER.
No. 332,860. Patented Dec. 22, 1885.
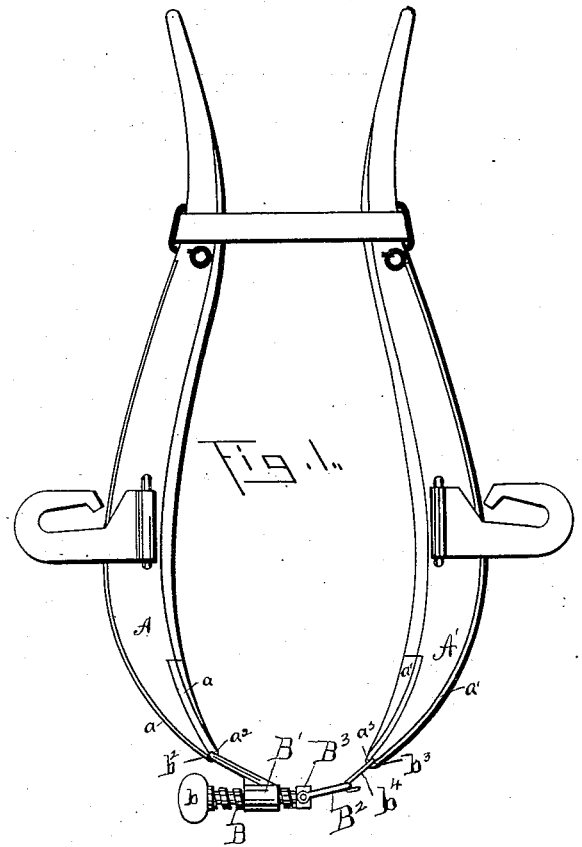
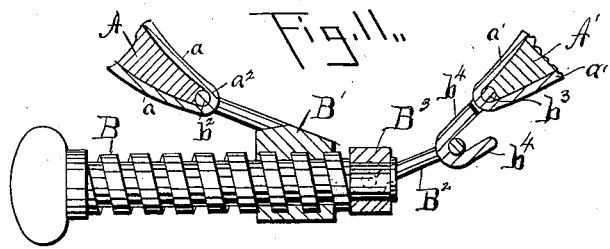
Witnesses:
Walter P. Pulis.
W. C. Orcutt
Inventor
Julius A. Alexander
By
Richards & Co.
Attorneys

UNITED STATES PATENT OFFICE.

JULIUS A. ALEXANDER, OF MONTICELLO, ARKANSAS.

HAME-FASTENER.

SPECIFICATION forming part of Letters Patent No. 332,860, dated December 22, 1885.

Application filed April 20, 1885. Serial No. 162,738. (No model.)

*To all whom it may concern:*

Be it known that I, JULIUS A. ALEXANDER, a citizen of the United States, residing in Monticello, in the county of Drew and State of Arkansas, have invented a new and useful Metallic Hame-Fastening; and I hereby declare the following to be a full and clear description thereof.

This invention has for its object an adjustable metallic fastening for the lower end of the hames of a horse's harness, whereby the harness may be securely and adjustably held up to the collar of the harness, the whole mechanism tending to secure a perfectly-fitting hame and one easy for the horse.

The invention will be readily understood by reference to the accompanying drawings, of which—

Figure 1 is a front elevation of a pair of hames secured together at the bottom by one of my improved metallic hame-fastenings. Fig. 2 is an enlarged sectional elevation of the metallic fastening.

The hames A A' have metallic bands or straps $a\ a'$, secured to their edges at their lower ends, very much in the same manner in which metallic binding-straps are now applied to wooden hames. These metallic strap-pieces are formed into loops $a^2\ a^3$ at the bottom ends of the hames, and into these loops the looped ends $b^2\ b^3$ of the metallic hame-fastening are secured. The said metallic fastening consists of a screw, B, threaded in a socket, B', which is secured to the loop-piece $b^2$, and the loop-link or coupling-piece $B^2$, which is secured at one of its extremities to the swivel-piece $B^3$, carried on the end of the screw B, and at its other end adapted to be engaged by a hook, $b^4$, formed in the free end of the loop-piece $b^3$. The screw B has a flattened thumb-piece, $b$, at its free end, by means of which it may be screwed into or out of the socket B'.

In using this hame-fastening the hook or loop piece $B^2$ is hooked onto the hame-loop $b^3$ by means of its hook $b^4$, and then the screw B turned by means of its handle $b$, so as to screw or draw the hames tightly to the collar, and the screw B is strong and powerful enough to draw the hames tightly into their proper seat in the collar, and thereby make them easier to the animal wearing them.

In unfastening the hames the screw B is easily and quickly withdrawn (in this case withdrawing is turning the screw forward) by turning the screw, and thereby releasing the hook $b^4$ from the hame-loop $b^3$, when the hames can easily be removed from the collar.

Having thus described my invention, what I claim as new, and desire to secure by Letters Patent, is—

1. A metallic hame-fastening consisting of a tightening-screw, B, threaded in a swinging socket-piece, B', which is attached by a swinging loop or link with the lower end of one of the hames, a swivel-piece, $B^3$, attached to the coupling end of the screw B, a swinging hook or link, $B^2$, attached to said swivel-piece and arranged to engage with a hook attached to the lower end of the other hame, as described.

2. A hame-fastening consisting of the screw B, socket B', coupling-piece $B^2$, swivel $B^3$, and the hame-loops $b^2\ b^3$, combined and operated as described.

In witness whereof I have hereunto set my hand this 4th day of April, 1885.

JULIUS A. ALEXANDER.

In presence of—
JOHN GRIGGS MCKENNEY,
GEORGE D. STEDMAN.